(12) United States Patent
Rub et al.

(10) Patent No.: US 11,074,032 B2
(45) Date of Patent: Jul. 27, 2021

(54) MULTI-CORE AUDIO PROCESSOR WITH LOW-LATENCY SAMPLE PROCESSING CORE

(71) Applicant: KNOWLES ELECTRONICS, LLC, Itasca, IL (US)

(72) Inventors: Leonardo Rub, Mountain View, CA (US); Brian Clark, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/649,945

(22) PCT Filed: Sep. 24, 2018

(86) PCT No.: PCT/US2018/052346
§ 371 (c)(1),
(2) Date: Mar. 23, 2020

(87) PCT Pub. No.: WO2019/067337
PCT Pub. Date: Apr. 4, 2019

(65) Prior Publication Data
US 2020/0278824 A1     Sep. 3, 2020

Related U.S. Application Data

(60) Provisional application No. 62/566,146, filed on Sep. 29, 2017.

(51) Int. Cl.
*G06F 3/16*     (2006.01)
*G06F 9/30*     (2018.01)

(52) U.S. Cl.
CPC .......... *G06F 3/162* (2013.01); *G06F 9/30036* (2013.01)

(58) Field of Classification Search
CPC ............................ G06F 3/162; G06F 9/30036
See application file for complete search history.

(56) References Cited

U.S. PATENT DOCUMENTS

| 8,618,961 B1 | 12/2013 | Massie et al. |
| 2011/0138259 A1* | 6/2011 | Tan ........................ H04L 1/0052 714/792 |
| 2011/0249744 A1 | 10/2011 | Bailey |

(Continued)

OTHER PUBLICATIONS

International Search Report and Written Opinion, PCT/US2018/052346, Knowles Electronics, LLC dated (Dec. 21, 2018).

(Continued)

*Primary Examiner* — Fan S Tsang
*Assistant Examiner* — David Siegel
(74) *Attorney, Agent, or Firm* — Foley & Lardner LLP

(57) ABSTRACT

A multi-core audio processor includes a data protocol interface configured to receive a stream of audio data, a plurality of data processing cores including a single sample processing core and a block data processing core, an audio fabric block configured to route samples of the stream between the data protocol interface and the plurality of data processing cores. The single sample processing core includes an execution unit configured to execute one or more low latency instructions for performing computations for the samples.

20 Claims, 7 Drawing Sheets

(56) References Cited

U.S. PATENT DOCUMENTS

2014/0180457 A1* 6/2014 Thakur ................ G06F 1/3215
 700/94
2016/0094340 A1* 3/2016 Wolrich ............... G06F 9/3895
 713/189
2016/0275043 A1* 9/2016 Grochowski ......... G06F 1/3287
2018/0081854 A1* 3/2018 Joy ........................ G06F 13/28

OTHER PUBLICATIONS

Shikano et al., "Heterogeneous Multi-Core Architecture That Enables 54x AAC-LC Stereo Encoding," IEEE Journal of Solid-State Circuits, vol. 43, No. 4, pp. 902-910 (Apr. 30, 2008).

* cited by examiner

MULTI-CORE AUDIO PROCESSOR WITH LOW-LATENCY SAMPLE PROCESSING CORE

CROSS-REFERENCE TO RELATED APPLICATIONS

This application is a National Stage Application of PCT/US2018/052346, filed Sep. 24, 2018, which claims the benefit of and priority to U.S. Provisional Patent Application No. 62/566,146, filed Sep. 29, 2017, the entire contents of which are incorporated herein by reference.

BACKGROUND

It is desirable to minimize the latency of processing tasks in digital signal processing. For example, when processing a stream of audio data, it is desirable to process samples of the stream as quickly as possible before overrun or underflow occurs. Certain applications, such as asynchronous sample rate conversion, phase alignment of multiple streams, ambient noise cancellation, and speaker excursion protection are particularly sensitive from a latency perspective.

DETAILED DESCRIPTION

Figure 1:
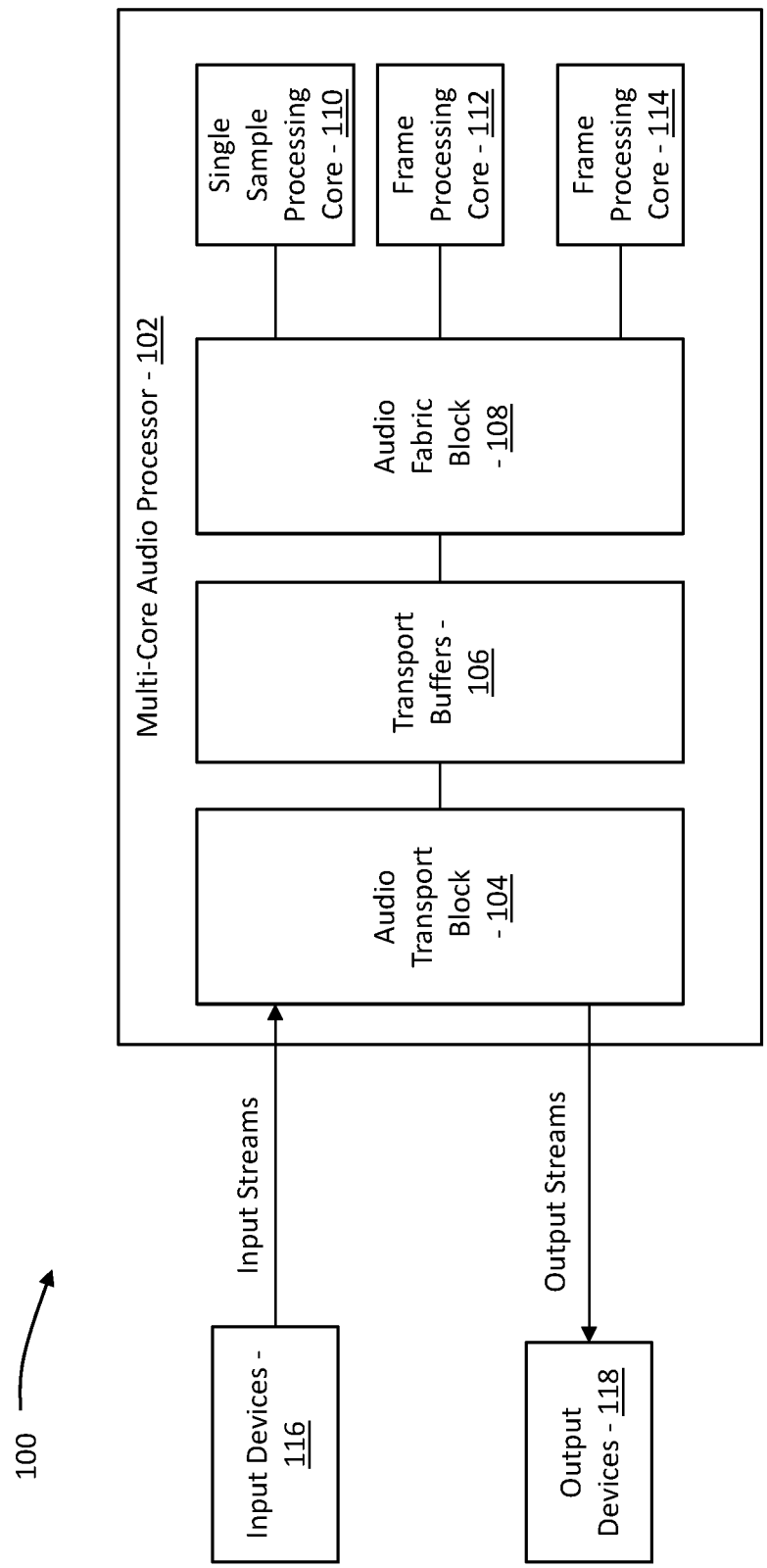
FIG. 1 is a block diagram of an environment of a multi-core audio processor.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Referring generally to the figures, described herein is a multi-core audio processor including a single sample processing core. The single sample processing core is tailored for performing specific tasks for sample-based digital signal (e.g., audio) processing with minimal latencies. In this regard, the single sample processing core includes execution units configured via various sets of hardware instructions. These execution units implement datapath elements (e.g., operation units) defined by the hardware instructions via a finite state machine of the single sample processing core. The datapath elements are configured to minimize the latency in the implementation of various signal processing applications (e.g., asynchronous sample rate conversion, phase alignment of multiple streams, ambient noise cancellation, speaker excursion protection). In a first example, a first execution unit is configured via a first set of hardware instructions to include sine and cosine computation units communicably coupled to a first location of a vector register and an exponential function computation unit communicably coupled to a second location of the vector register. The first execution unit computes sine and cosine values of an angle stored at the first location and an exponential value of a magnitude stored at the second location during execution of a single instruction to minimize the number of execution cycles required for the computation of the sine, cosine, and exponential values.

In another example, a second execution unit is configured via a second set of hardware instructions to compute a quotient of an elapsed time and an output sample time increment. The elapsed time may be in units of input samples. For example, the quotient may be used to identify a number of output samples to generate per input sample of audio data received via an I/O interface of the single-sample processing core. A fixed point division computation unit may be employed to compute a quotient of a fractional part of the elapsed time and a portion of the output sample time increment with minimum latency. The quotient may be used to identify a number of output samples to compute per input sample received to provide zero overhead loops when executing an output stage of a filter. In some embodiments, the first and second execution units are employed during an implementation of an asynchronous sampling rate conversion (ASRC) algorithm to minimize the latency thereof.

In another example, a third execution unit may be configured by a third set of hardware instructions to include a plurality of operation (e.g., multiplication) units, a vector register file, and a set of state registers. In some embodiments, there are a plurality of hard-wired routes coupling various locations of the vector register file to the operation units. The set of state registers store values assigning specific locations within the vector register file to specific ones of the operation units. The third execution unit is configurable to execute a set of program instructions. The program instructions may include configurable element selection depending on a value of an immediate field of an instruction. In an example, if the most significant bit of the immediate field is zero, the remaining bits of the immediate field specify a set of hard-wired routes to be enabled for directing data stored in the vector register file to the operation units. If the most significant bit of the immediate field is one, the remaining bits of the immediate field specify one of the state registers, and an assignment value stored therein is used to assign locations of the vector register file to specific operation units. The use of the state registers eliminates the need to re-load routing registers during multiple executions of program instructions, thereby minimizing latency incurred in performing the operations via the operation units. Additionally, the inclusion of the hard-wired routes diminishes the number of state registers necessary to reduce hardware costs.

Referring now to FIG. 1, an environment 100 including a multi-core audio processor 102 is shown, according to an example embodiment. Generally, the multi-core audio processor 102 is configured to receive input streams of data (e.g., audio data) from a plurality of input devices, perform various processing tasks (e.g., noise cancellation, filtering, etc.) on the input streams via a plurality of processing cores 110, 112, and 114, and transmit output streams of data to at least one output device 118.

The input devices 116 may communicate input streams to the multi-core audio processor 102 having a variety of different characteristics. For example, a first input device 116 may input a physical stream of a first data type (e.g., pulse code modulation-encoded data) and a second input device 116 may input a physical stream of a second data type (e.g., pulse density modulation-encoded data). To facilitate the processing of such a variety of data types, the multi-core audio processor 102 includes an audio transport block 104. The audio transport block 104 includes a plurality of different types of interfaces (e.g., audio interfaces) configured to perform operations (e.g., serialization and deserialization, filtering, etc.) on streams after their reception from the input devices 116 and prior to their transmittal to the output devices 118 (e.g., via data ports). For example, in one embodiment, the audio transport block 104 includes a plurality of PCM interfaces and a plurality of PDM interfaces configured to serialize and de-serialize constituent channels of the streams received via the input devices 116 and processed via the processing cores 110, 112, and 114.

In various embodiments, streams input to the multi-core audio processor 102 each include a plurality of coherent channels having the same sampling rate. To facilitate low latency processing of the streams, it is desirable to maintain this coherency when storing samples of the streams in queues for processing. In this regard, the multi-core audio processor 102 further includes a plurality of transport buffers 106. In some embodiments, the multi-core audio processor 102 includes a transport buffer for each audio interface included in the audio transport block 104. In some embodiments, each transport buffer includes a plurality of asynchronous first-in-first-out (FIFO) buffers. Groupings of the FIFO buffers may be coupled to one another so as to synchronously store data of constituent channels of various streams to maintain the coherency of the constituent streams. Each stream may have an associated identifier. The identifier for a stream may be correlated with the audio interface used to communicate data of the stream. For example, in one embodiment, the audio transport block 104 include six PCM interfaces. If a stream is received by the sixth PCM interface, the stream identifier may identify that interface (e.g., PCM 6). In various embodiments, the multi-core audio processor 102 also includes an audio fabric block 108 configured to store such identifiers in accordance with a logical address map. For example, each identifier may be stored in a location that identifies the grouping of FIFO buffers storing data of a corresponding stream. This way, upon receipt of an identifier (e.g., from one of the processing cores 110, 112, and 114), the audio fabric block 108 can route data (e.g., via routing hardware including a set of multiplexers enabled via the logical address map) to a requesting processing core. In some embodiments, the audio fabric block 108 also includes sample counters configured to count numbers of samples received at the audio transport block. Additionally, the audio fabric block 108 may also include a presentation timer configured to cause the transport buffers 106 to provide presentation times to the processing cores 110, 112, and 114 when the processing cores read data via the audio fabric block.

The processing cores 110, 112, and 114 may be digital signal processing cores having different processing capabilities. In the example shown, the processing core 110 is a single sample processing core and the processing cores 112 and 114 are frame processing cores. As such, the processing core 110 includes various hardware components designed specifically to perform sample-based (e.g., the application of filter banks, sample rate conversion, etc.) processing tasks on input samples received via the audio transport block 104. The details of such hardware components are described in greater detail herein with respect to FIGS. 2-9. The processing cores 112 and 114, on the other hand, include various hardware components designed to perform block data processing tasks on sets of samples (e.g., frames) of the streams received via the audio transport block 104. Thus, by the inclusion of multiple processing cores optimized to perform different types of data processing, the multi-core audio processor is able to perform multiple tasks simultaneously to maximize the speed with which various functions are carried out.

In some embodiments, the multi-core audio processor 102 further includes non-digital signal processing cores, such as a main controller processor configured to arbitrate undedicated resources (e.g., memory) between the processing cores. The main control processor may be of an ARM architecture. Additionally, a system controller processing core may be configured to handle other tasks (e.g., system wakeup, power down, etc.). In some embodiments, the processing core 110 is directly connected to the audio fabric block 108 via a native bus of the audio fabric block 108. The other processing cores may be communicably coupled to the audio fabric block 108 by a processor interconnection structure. For example, the processor interconnection structure may couple each of the processing cores of the multi-core audio processor 102 to one another and be coupled to the audio fabric block 108 via a communications bridge.

In various embodiments, the multi-core audio processor 102 includes a dedicated memory (e.g., random access memory) for each processing core contained there. For example, the dedicated memory may store program instructions and data serving as inputs to the program instructions executed by the processing cores 110, 112, and 114. Additionally, the multi-core audio processor 102 may also include a pool of undedicated memory. The main controller processor may update allocation logic of a central memory switch to change how the undedicated memory is allocated amongst the processing cores.

Figure 2:
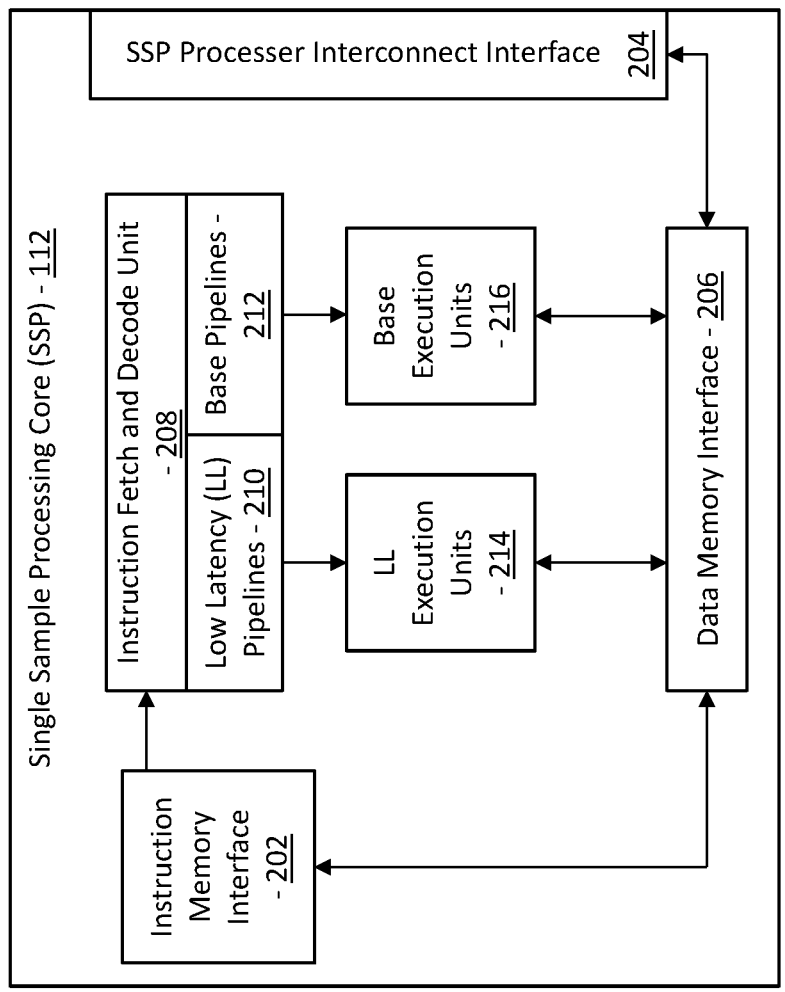
FIG. 2 is a block diagram of a single sample processing core of the multi-core audio processor depicted in FIG. 1.

Referring now to FIG. 2, a schematic diagram of the single sample processing core 112 of FIG. 1 is shown. As shown, the single sample processing core 112 includes an instruction memory interface 202 (e.g., associated with an address bus and an instruction bus) in communication with an instruction memory (e.g., a portion of a dedicated memory of the single sample processing core 112) and a data memory interface 206 in communication with a data memory (e.g., another portion of the dedicated memory). The single sample processing core 112 further includes an instruction fetch and decode unit 208 configured to decode program instructions received via the instruction memory interface 202.

In various embodiments, the single sample processing core 112 includes a set of base execution units 216 (e.g., load and store units, arithmetic logic units, etc.) of various types configured to execute base program instructions for base data processing tasks (e.g., fixed and floating point scalar and vector arithmetic operations, etc.). Such base program instructions may have base execution pipelines 212 having an associated pipeline control breaking up instruction lifecycles into parallel segments to maximize data throughput in the performance of the base data processing tasks. The base execution units 216 execute the base program instructions to perform tasks (e.g., scalar and vector operations, etc.) on data loaded from memory via the data memory interface 206.

In addition to the base execution units 216, the single sample processing core 112 further includes a plurality of low latency execution units 214. For example, in various embodiments, datapath elements of the low latency execution units 214 are generated via a firmware-controlled state machine of the single sample processing core 112. Firmware controlling the datapath elements includes a set of hardware instructions chosen to provide the low latency execution units 214. The datapath elements include various operation units and task-specific registers (e.g., vector register files, state registers, etc.) enabling the execution of a set of low latency audio processing instructions. The low latency audio processing instructions may have low latency execution pipelines 210 having an associated pipeline control breaking up lifecycles of the low latency instructions into parallel segments to maximize data throughput. As described herein, the low latency instructions executed via the low latency execution units 214 are designed to minimize the latency with which the single sample processing core 112 performs various tasks in processing of samples of the streams received via the audio transport block 104. In other words, via the incorporation of the low latency execution units 214, the single sample processing core 112 is able to execute program instructions specifically designed to lower latency in crucial data processing tasks.

The single sample processing core 112 further includes a processor interconnect interface 204. The processor interconnect interface 204 is communicably coupled to a system bus of the multi-core audio processor 102. In some embodiments, via the processor interconnect interface 204, the single sample processing core 112 is in communication with the audio fabric block 108. As such, input samples of various streams received via the audio transport block 104 may be communicated between the transport buffers 106 and the single sample processing core 112 via the SSP processor interconnect interface 204. In some embodiments, the single sample processing core 112 also includes a queue interface directly coupled to the audio fabric block 108 via a native bus thereof. Samples of audio data received from the audio fabric block 108 may be stored in system memory associated with the single sample processing core 112 via load and store units of the single sample processing core 112. Once stored in memory in association with an address, the sample may be retrieved via execution of program instructions (e.g., base instructions, low latency instructions, etc.) to perform various operations thereon.

Figure 3:
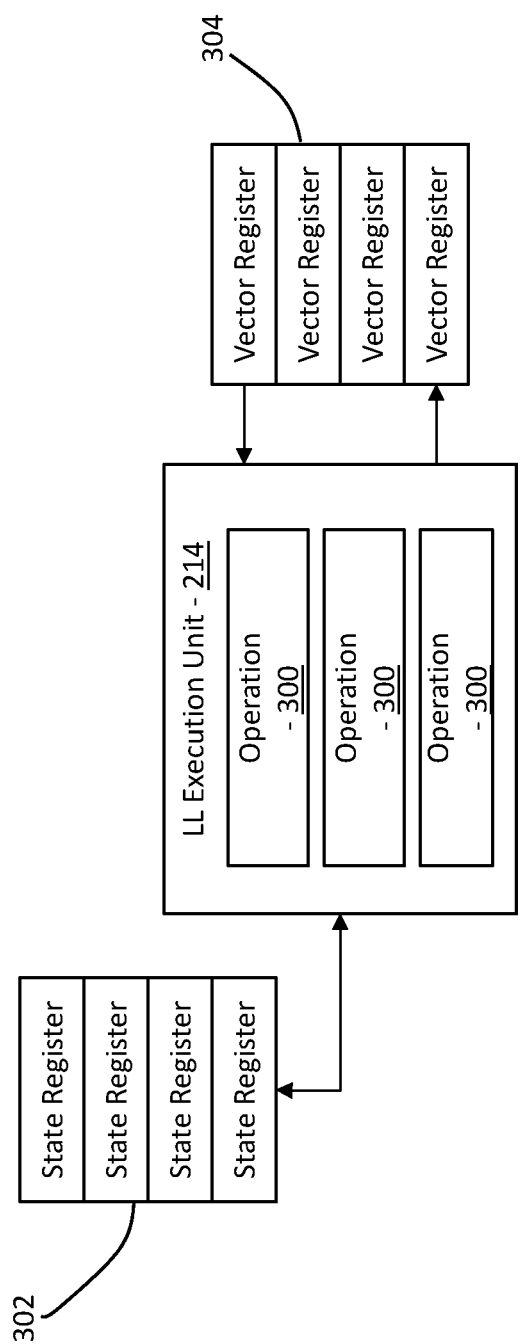
FIG. 3 is a block diagram of various components of an execution unit of the single sample processing core shown in FIG. 2.

Referring now to FIG. 3, a schematic diagram of various datapath elements associated with a low latency execution unit 214 is shown. As described herein, the single sample processing core 112 is configured to include such data path elements via hardware instructions decoded by a firmware controlled state machine. The datapath elements described with respect to FIG. 3 are exemplary only. Various elements are left out for the purposes of illustration.

As shown, the datapath elements include a low latency execution unit 214 including operation units 300 arranged to facilitate execution of low latency program instructions. The operation units 300 may include hardware-implemented computation units in communication with a register file to facilitate the retrieval of data from the register file, the performance of computations on the retrieved data, and the re-storage of the computed data into the register file based on inputs of low-latency instructions executed via the low latency execution unit 214. In the example shown, the register file is embodied as a vector register file 304 including a plurality of series of individual multi-bit (e.g., thirty two bit) registers. Data stored within address ranges of a system memory may be loaded into the vector register file (e.g., via the data memory interface 206) in unison to reduce latency of computations performed on the data.

Additionally, the datapath elements also include a set of state registers 302 storing information used to control the operation units 300 in the execution of the low latency instructions. In various embodiments, the state registers set control bits associated with the operation units 300 based on a value an immediate field input of a low latency instruction being executed via the low latency execution unit 214. As described herein, the state registers 302 facilitate flexibility in terms of operations performed on the data stored in the vector register file 304.

Figures 4, 5:
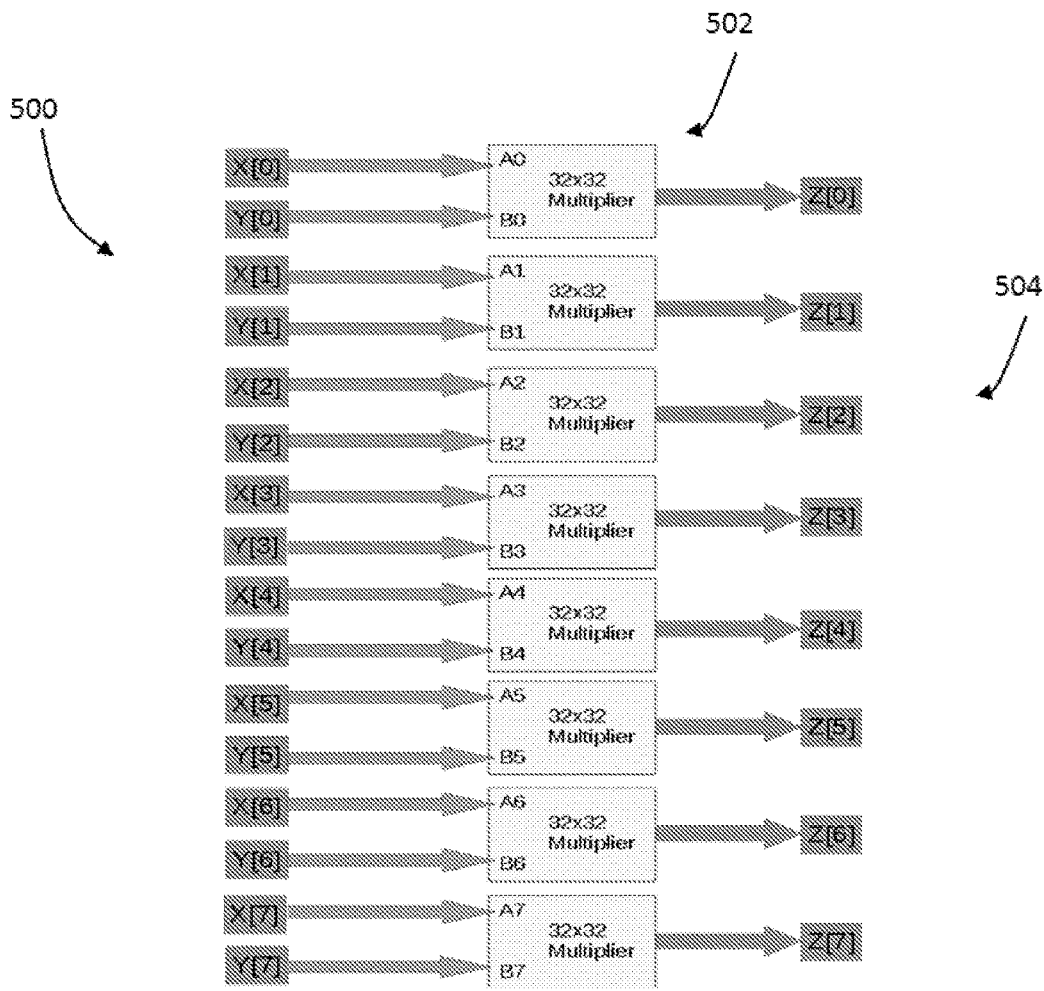
FIG. 4 is a chart depicting the contents of a vector register file of the execution unit shown in FIG. 3.
FIG. 5 is a schematic diagram of operations performed via the execution unit shown in FIG. 3.

FIG. 4 is a chart 400 depicting the contents of the vector register file 304. As shown, the vector register file 304 includes eight vector registers V0:V7. Each vector register includes eight multi-bit registers. In the example shown, the vector register file 304 includes thirty two bit individual registers arranged as shown, such that each vector register V0:V7 may store eight thirty two bit values VX[0:7].

Referring now to FIG. 5 is a schematic diagram illustrating operations via an execution unit (e.g., a vector arithmetic unit) upon execution of an instruction is shown, according to an example embodiment. As shown, a vector register file 500 (e.g., similar to the vector register file 304 described with respect to FIGS. 3-4) includes a plurality of eight-entry vector registers. The execution unit is configured to execute a vector multiply instruction Z=vmul(X,Y) via a plurality of multiplication units 502, where X represents a first vector register of the vector register file 500 (e.g., X[0:7]) and Y represents a second vector register of the vector register file (e.g., Y[0:7]). As shown, the multiplication units 502 include inputs A and B that are wired to the vector registers identified via the inputs to the vector multiply instruction.

As such, the vmul instruction performs the following operations Z[0]=X[0]*Y[0], Z[0]=X[1]*Y[1], Z[2]=X[2]*Y[2], etc. Thus, while this instruction achieves acceleration over a scalar execution unit via performing multiple operations simultaneously, the instruction is limited since each element of the first input vector X can only be multiplied by a corresponding element of the second input vector Y.

A way to further increase flexibility is to add an immediate field to the vmul instruction. The immediate field adds flexibility in assigning vector elements X[0:7] and Y[0:7] to different inputs A and B of the multiplication units 502. For example, one may define an additional vector U including a concatenation of X and Y and assign indices associated with the inputs A and B of the different multiplication units 502. In this example, since there are eight multiplication units 502, there are sixteen indices that must be assigned to the additional vector U. As such, sixty four bits are needed to represent each of the 16 indices, which means that 64 bits are necessary to provide complete flexibility in terms of assignments to the inputs.

Since the addition of a sixty four bit immediate field to the vmul instruction is not practical, one way to achieve this flexibility is to add a register file R to the datapath of the execution unit. The register file R may include 64-bit registers storing assignment values to the multiplier inputs A and B. Thus, a new multiply instruction Z=vmulR(X, Y, P), may be defined based on the new datapath. In this example, P specifies one of the registers of the register file R and thus identifies a set of assignments for the inputs of the multiplication units 502. However, there may be sets of assignments between the input vectors X and Y and the multiplication units 502 that are particularly common (e.g., such as the assignments shown in FIG. 5). Storing such assignments in the register file R would be wasteful. To prevent wasteful inclusion of additional registers in the register file R, one may define a second instruction Z=vmulH(X, Y, H), where H is an immediate field specifying one of the most common routes. Thus, when one desires to use one of the common sets of assignments, one executes the vmulH instruction, and when one desires to use an uncommon set of assignments, one executes the vmulR instruction. This pair of instructions minimizes the necessary size of the register file R while adding flexibility over the vmul instruction.

When programming the multi-core audio processor in a high level language (e.g., C), function calls are used to reduce code size and achieve modularity. While this speeds up software development, the use of such high level language may add latency because variables need to be defined and loaded from memory. For example, referring to the vmulH and vmulR instructions above, the need to load the register file R adds the latency of the multiplication operations. This is illustrated by the following pseudocode:

```
void func1( )
{
    // Register variable types:
    // can reside in registers or memory (as automatic variables)
    R P;    // Not known which register of R is P, so it must be loaded
            here
    R Q;    // Not known which register of R is Q, so it must be loaded
            here
    V X;
    V Y;
    V Z;
    .
    .
    .
    Get routing from memory and load P;    // Adds to latency
    Z = vmulR(X, Y, P);
    .
    .
    .
```

-continued

```
    Get routing from memory and load Q;    // Adds to latency
    Z = vmulR(X, Y, Q);
    .
    .
    .
}
```

In other words, the need to load the assignment values from memory into the routing register R adds to the latency of the multiplication operations. This can be avoided by adding a set of state registers S0, S1, S2, etc. to the datapath of the execution unit. For example, in one embodiment, eight sixty four bit state registers are added to replace the register file R. Additionally, the instructions vmulR and vmulH are replaced with a new instruction having the syntax Z=vmulS(X, Y, S), where S is a four bit immediate field. In an example, if one of the bits (e.g., the most significant bit) of the immediate field is zero, the remaining bits select one of the sets of common assignments, and the execution unit routes data from the input vector registers to the multiplication units 502 based on the remaining three bits (thus replacing the vmulH instruction). If the most significant bit of the immediate field is one, the remaining bits select a state register, which stores assignment values assigning locations in the input vectors to the multiplication units 502.

Since the state registers are directly specified via an immediate field, one needn't declare variables to assign to register file registers. As such, the values stored in the state registers are is persistent and there is no need to re-load them after different execution cycles. This avoids the latency associated with the vmulR instruction described herein. As such, one of the low latency execution units 214 described herein may include a set of state registers storing pre-loaded assignment values specifying locations of input vectors to specific inputs of operations of the low latency execution unit 214. The state registers used in execution of a low latency instruction is identified directly via an immediate field, thereby avoiding latency incurred in assigning registers to declared routing variables.

In various embodiments, the single sample processing core 112 includes a plurality of low latency execution units 214 for executing instructions used in the performance of asynchronous sampling rate conversion (ASRC) on streams of data received via the audio transport block 104. For example, the single sample processing core 112 employs an infinite impulse response (IIR) ASRC phasor filter including an input stage and an output stage.

Figure 6:
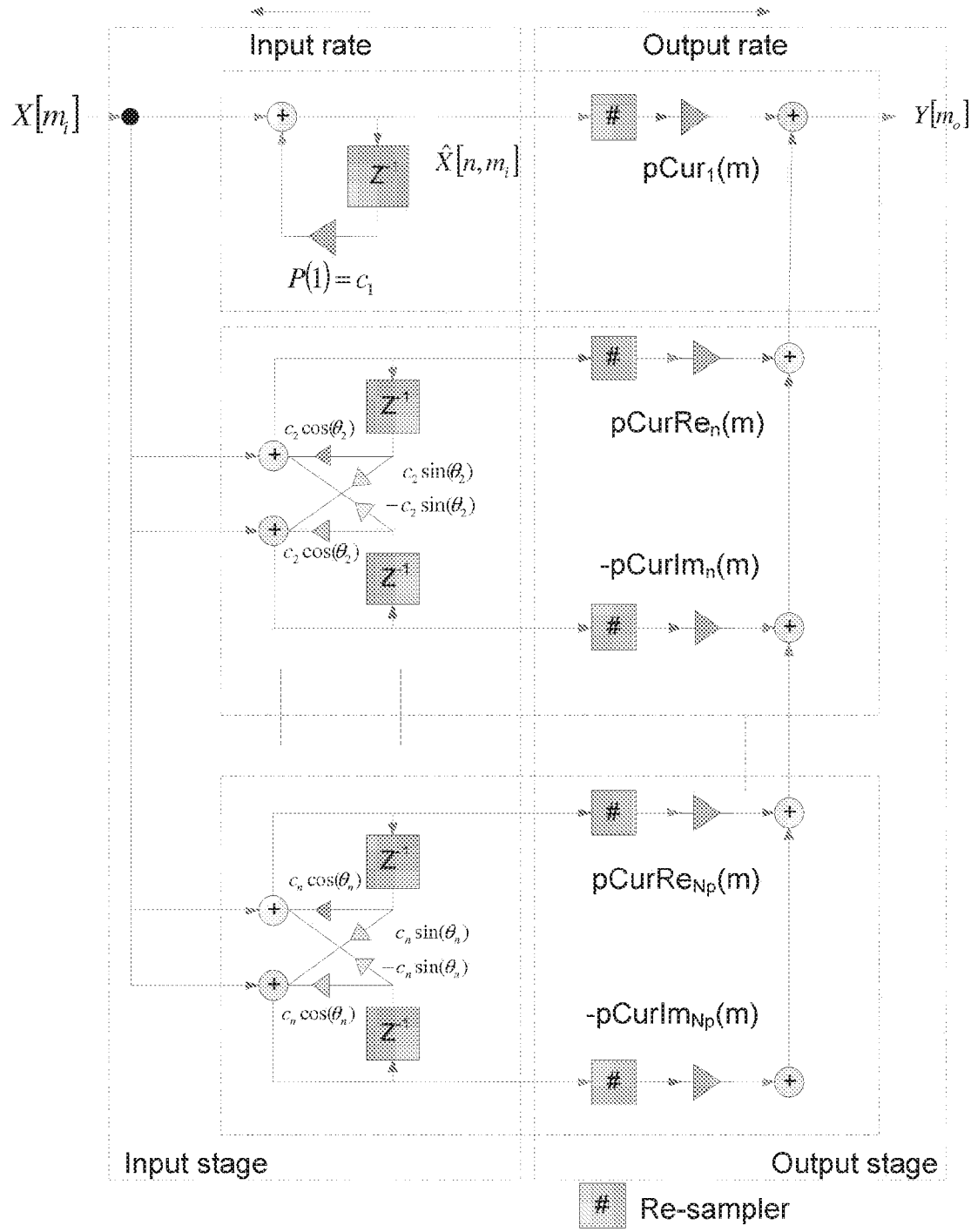
FIG. 6 is an operational diagram of an asynchronous sampling rate conversion filter.

FIG. 6 provides a high level block diagram of an example IIR ASRC real phasor filter employed. The phasor filter includes an input stage and an output stage. As shown, an input sample $X[m_i]$ is received (e.g., directly from the audio fabric block 108, retrieved from system memory, etc.) and summed with a plurality of signals generated by feedback paths contained in the input stage. In some embodiments, there are a plurality of pairs of feedback paths, with each pair including a real path and an imaginary path. The feedback paths include $Z^{-1}$ blocks, which are essentially delay units. The outputs of the delay units are multiplied by respective pole coefficients (denoted in FIG. 6 by $c_n*\cos(\Theta_n)$ and by $c_n*\sin(\Theta_n)$). The pole coefficient $\Theta_n$ controls the resonance frequencies of the phasor filter and the pole coefficient $c_n$, controls the magnitude of the pole positions and the decay time of the phasor filter.

Poles of the phasor filter may be defined by the following relationship:

$$P_n = e^{real(s_n*T)}*(\cos(\text{image}(s_n*T)) + i*\sin(\text{image}(s_n*T))) \quad (1)$$

where $s_n$ corresponds to an Np s-plane pole of a transfer function of an analog phasor filter and $T=1/F_s$, where $F_s$ corresponds to an input sampling rate. In other words, the pole coefficients $\Theta_n$ correspond to the imaginary component of the value $s_n*T$ and the pole coefficients $c_n$ correspond to the exponential of the real component of the value $s_n*T$. Accordingly, to efficiently apply the filter input stage, one must compute the values $c_n*\cos(\Theta_n)$ and by $c_n*\sin(\Theta_n)$ in advance of the filtering. This involves the computation of the sine and cosine of the imaginary component of $s_n*T$ and the computation of an exponential of the real component of $s_n*T$. For more information regarding design of the phasor filter, see U.S. Pat. No. 8,618,961, hereby incorporated by reference in its entirety.

In the example shown, the ASRC phasor filter also includes an output stage. The output stage includes time-varying output stage time coefficients (denoted in FIG. 3 by pCurRe(m) and pCurIm(m)). In various embodiments, the output stage time coefficients are computed via the following relationship:

$$PCur_n^{\Delta t}=c_n^{\Delta t}*(\cos(\Theta_n*\Delta t)+\sin(\Theta_n*\Delta t)) \quad (2)$$

where $\Delta t$ represents an elapsed time increment. As such, the output stage time coefficients represent scaled versions of the input stage filter time coefficient values.

The application of the phasor filter shown in FIG. 6 may be described as follows. The input filter coefficients are applied to an input sample to generate a plurality of filtered sample values. The filtered sample values are then stored in a data buffer (e.g., a register file). The output stage of the filter is then executed a number of times on the filtered sample values depending on an expected time of arrival for another input sample (e.g., based on the input sampling rate). Each time the output stage of the filter is executed, the input filter coefficients are scaled based on an elapsed time increment and the scaled input filter coefficients are applied to corresponding ones of the filtered sample values to generate a plurality of scaled sample values. Each plurality of scaled sample values is then summed together to generate an output sample. Thus, by varying the number of times that the output stage is executed per input sample, the relationship between the output and input sampling rates of the ASRC algorithm is varied.

Figure 7:
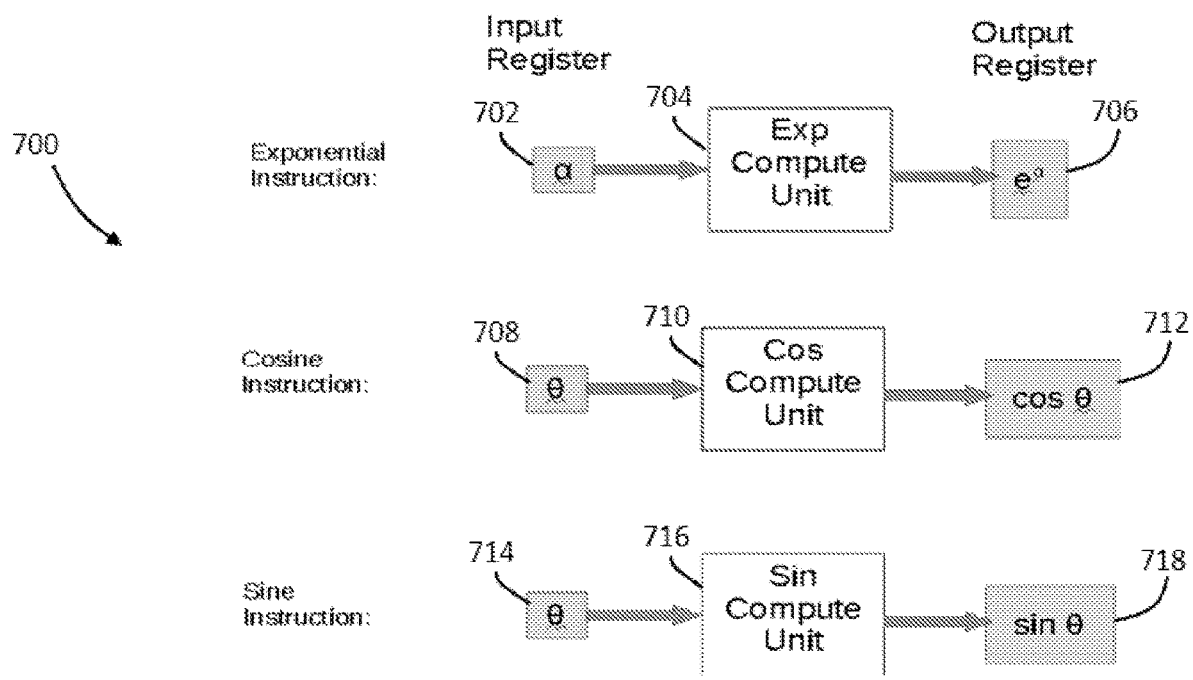
FIG. 7 is a block diagram depicting the execution of instructions by an execution unit to compute a sine and cosine of an angle and an exponential function of a magnitude.

To perform the ASRC algorithm, it is necessary to compute various outputs from the magnitude and angle coefficients of the phasor filter used. In this regard, the single sample processing core 112 described herein with respect to FIGS. 1-2 includes an execution unit (or units) for computing these outputs. FIG. 7 shows high level diagram of an execution sequence 700 for computing these various outputs. As shown, the execution sequence 700 involves the execution of three separate instructions: an exponential instruction, a cosine compute instruction, and a sine compute instruction. Each of these instructions takes a single input (e.g., $c_n$, $\Theta_n$) and generates a single output. In an example, the execution sequence 700 is executed via one of the base execution units 216 including, for example, an exponential compute unit 704, a cosine compute unit 710, and a sine compute unit 716. Assuming that the base pipelines 212 enable two execution cycles per instruction, the execution pipeline is described as follows:

| Cycle | Fetch | Decode | Execute 0 | Execute 1 | Register Write |
|---|---|---|---|---|---|
| 0 | exp | | | | |
| 1 | cos | exp | | | |

-continued

| Cycle | Fetch | Decode | Execute 0 | Execute 1 | Register Write |
|---|---|---|---|---|---|
| 2 | sin | cos | exp | | |
| 3 | | sin | cos | exp | |
| 4 | | | sin | cos | exp($\alpha$) |
| 5 | | | | sin | cos($\theta$) |
| 6 | | | | | sin($\theta$) |

Thus, the computation of the exponential of, cosine, and sine incurs 7 cycles of latency and three cycles of throughput.

Figure 8:
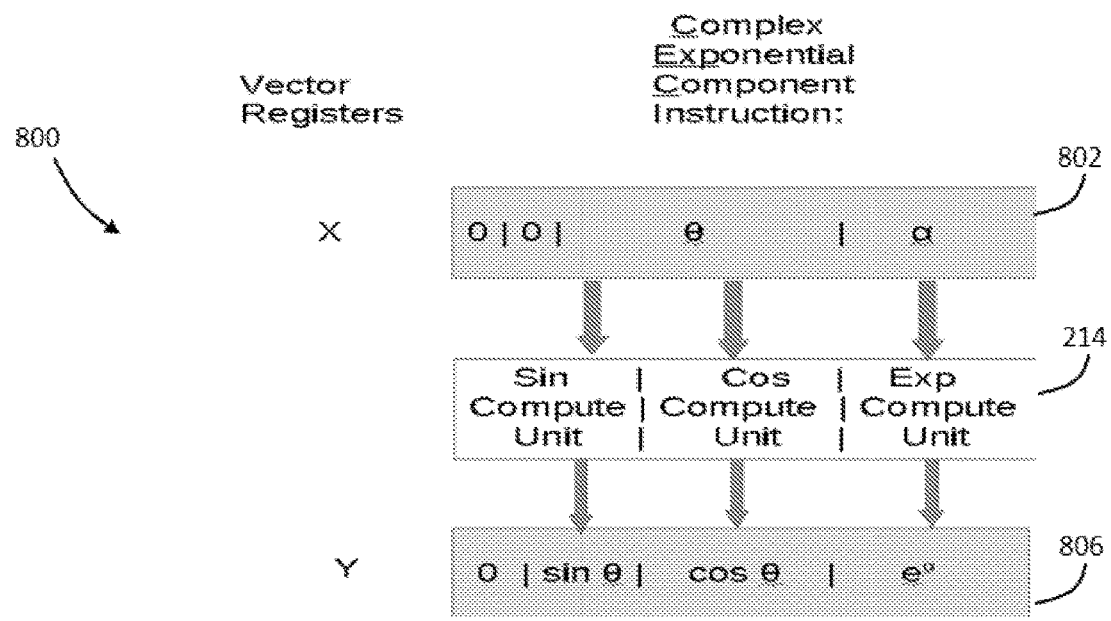
FIG. 8 is a block diagram depicting the execution of a single instruction by a low-latency execution unit to compute a sine and cosine of an angle and an exponential function of a magnitude.

In some embodiments, the single sample processing core 112 includes a low latency execution unit 214 specifically designed to reduce the latency in performance of these calculations over the execution sequence 700 described with respect to FIG. 7. FIG. 8 provides a schematic illustration of a datapath 800 of such an execution unit. As shown, the datapath 800 includes a first vector register 802, a low latency execution unit 214, and a second vector register 804. In some embodiments, the first and second vector registers 802 and 804 are both components of the same vector register file. As shown, the first and second vector registers 802 and 804 each store four element vectors, but they may store vectors having any number of elements greater than two. The low latency execution unit 214 includes an exponential compute unit, a cosine compute unit, and a sine compute unit. The exponential compute unit, a cosine compute unit, and a sine compute unit may compute the outputs using a number of methods including piecewise polynomial approximations, Newton-Raphson iteration, or other methods.

In various embodiments, the low latency execution unit 214 is configured to execute a single program instruction taking a two inputs (e.g., a logarithm of $c_n$ and $\Theta_n$) to compute three outputs (e.g., an exponential of the logarithm of $c_n$, $\cos(\Theta_n)$, and $\sin(\Theta_n)$). For example, this instruction may have the syntax Y=CexpC(x). An execution pipeline for this instruction may be as depicted in the following table.

TABLE 1

| Cycle | Fetch | Decode | Execute 0 | Execute 1 | Register Write |
|---|---|---|---|---|---|
| 0 | CexpC | | | | |
| 1 | | CexpC | | | |
| 2 | | | CexpC | | |
| 3 | | | | CexpC | |
| 4 | | | | | sin($\theta$) | cos($\theta$) | exp($\alpha$) |

Thus, the low latency execution unit 214 only incurs 5 cycles latency and one cycle throughput. This is three times faster than the execution sequence 700 described with respect to FIG. 7, thus providing a significant reduction in latency in the performance of the ASRC algorithm. In some embodiments, such a low latency execution unit 214 may be used to generate coefficient values for polynomial approximations for various functions.

In various embodiments, a ratio of an input sampling rate of a stream input to the single sample processing core 112 to an output sampling rate generated via the ASRC filter described herein differs with time. Thus, when up-sampling, the number of times that the output stage of the ASRC filter must be executed per input sample received is not known in advance. Accordingly, some instruction sets implementing the ASRC filter described herein employ conditional branching where the output stage of the ASRC filter is executed until a time condition is met (e.g., a period from the previous input sample reaches a predetermined value). However, conditional testing and branching adds extra latency to this filtering.

Accordingly, in some embodiments, the single sample processing core 112 includes an additional low latency execution unit 214 for executing an instruction that performs fixed-point division to generate a quotient of an elapsed time in units of input samples ("X") and an output sample time increment in units of input samples ("Y"). The value X is a fractional value and is incremented depending on a ratio of the output sampling rate to the input sampling rate. In some embodiments, each time an input sample is received, a new value of X is used to re-compute the quotient using an updated value of Y to determine a number of times needed to execute the output stage of the ASRC filter. Such a computation enables the use of zero overhead loops in terms of determining how many times to execute the output filter stage when up-sampling, and thus avoids the extra latency incurred from conditional branching.

Figure 9:
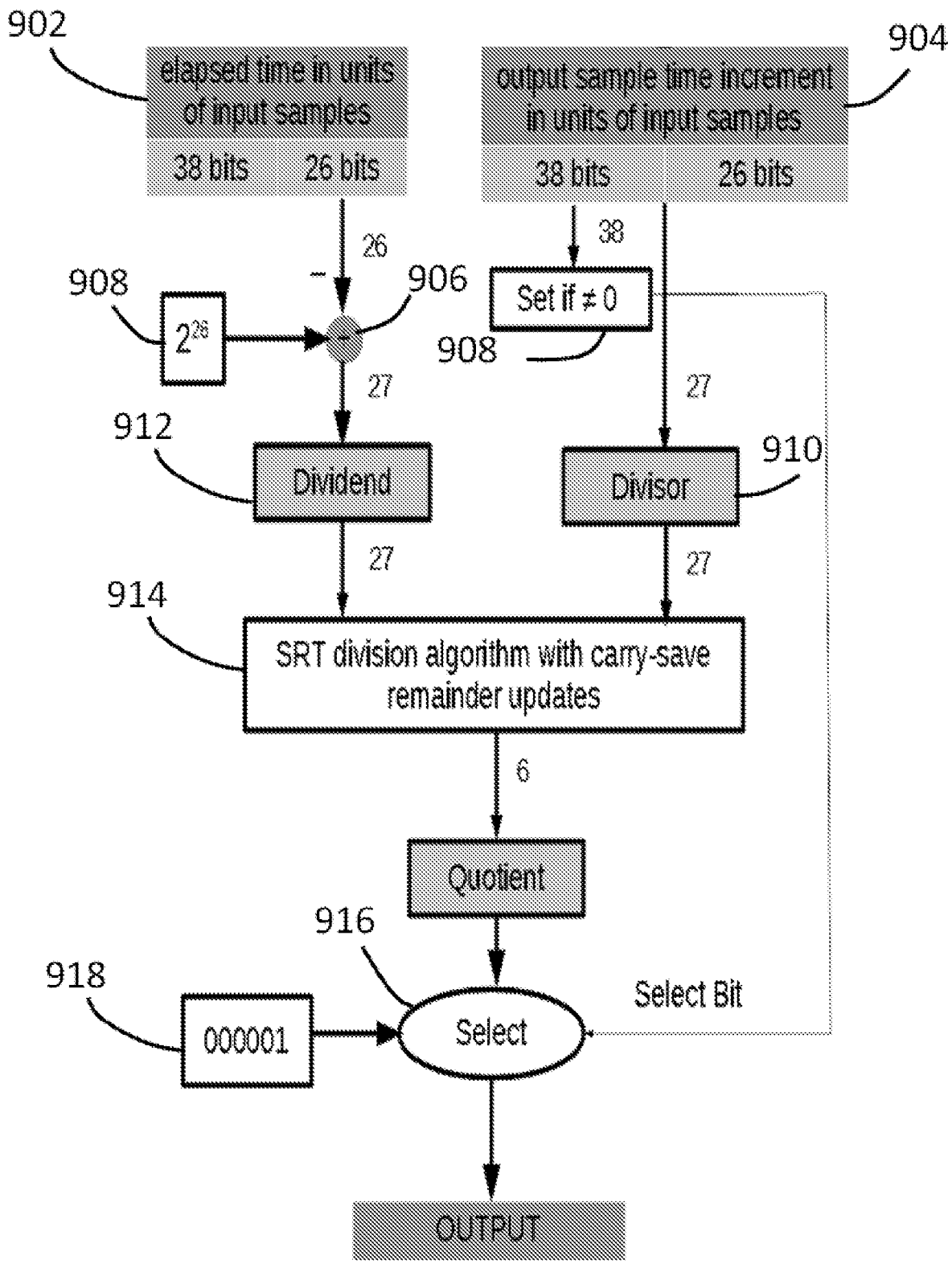
FIG. 9 is a block diagram depicting various operations of a low latency execution unit computing a quotient.

FIG. 9 is a block diagram of a various operations performed via the low latency execution unit 214 to compute the quotient. As shown, a first register 902 stores a value for X and a second register 904 stores a value for Y. In the example shown, each value of X and Y is a sixty four bit value, with the first 38 bits representing an integer part and the remaining 26 bits representing the fractional part. In some embodiments, a count of the number of input samples associated with a stream received via the multi-core audio processor 102 is received from the audio fabric block 108, which includes a number of sample counters configured to increment each time samples are stored in a corresponding one of the transport buffers 106. The count of the number of samples is then used to compute values for X and Y.

As shown, a selection bit routes the fractional part of X to a subtraction unit 906, where a predetermined value 908 is subtracted from the fractional part of X to form a dividend 912 for the computation of the quotient. In various embodiments, the predetermined value is an inverse of an input sampling rate (i.e., a sampling period) associated with the input stream. As such, the output of the subtraction unit 906 represents a fractional time interval remaining until the next input sample is received. Additionally, a control bit determines if any of the thirty eight most significant bits of Y (e.g., representing an integer part of Y) are non-zero. If so, it is indicative that an interval between output samples is too long (i.e., because, when up-sampling, there should be multiple output samples per input sample). In such a case, the execution unit waits until receipt of the next input sample to re-calculate the quotient. In this regard, if any of the thirty eight most significant bits of Y are non-zero, the execution unit advances to a selection block 916 where a select bit is enabled to cause a delay in the execution of the quotient until receipt of the next input sample.

However, if none of the thirty eight most significant bits of Y are non-zero, a portion of Y (e.g., the 27 most significant bits of Y) form a divisor 910 for computation of the quotient. In the example shown, a Sweeney, Robertson, and Tocher (SRT) division algorithm is employed to compute a six bit quotient. While a standard divider could be used to compute the quotient, the use of an SRT division algorithm enables the computation to be performed with a modest amount of hardware.

The quotient is then provided to a selection block 916 where the quotient is compared to a predetermined value. In various embodiments, the selection block 916 selects the minimum between the integer above the quotient (i.e., ciel(quotient)) and a predetermined value. For example, if a six bit quotient is used, the predetermined value may correspond to sixty three to support an up-sampling factor of up to two hundred and fifty five.

The output of the selection block 916 represents a number of output samples generated per input sample processed (e.g., via the input stage of the ASRC filter described herein). As such, the predetermined value essentially sets a cap on the up-sampling factor that the ASRC filter can be used to produce. The cap may be restricted to facilitate the stability of the ASRC algorithm. Thus, each time an input sample is received, the operations shown in FIG. 9 may be performed to determine in advance a number of times to execute the output filter stage. This avoids the extra latency incurred when conditional testing and branching is included in the filter output stage instruction sets.

The flowchart and block diagrams in various Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A multi-core audio processor comprising:
   a data protocol interface configured to receive a stream of audio data;
   a plurality of data processing cores including a single sample processing core and a block data processing core; and
   an audio fabric block configured to route samples of the stream between the data protocol interface and the plurality of data processing cores,
   wherein the single sample processing core comprises an execution unit configured to execute one or more low latency instructions for performing computations for the samples.

2. The multi-core audio processor of claim 1, wherein the execution unit is a first vector execution unit comprising a cosine operation unit, a sine operation unit and an exponential operation unit, the first vector execution unit configured to compute first, second and third outputs in a single execution cycle of the first low latency instruction.

3. The multi-core audio processor of claim 1, wherein the single sample processing core comprises:
   an instruction memory interface communicably coupled to a memory, the memory storing a first low latency instruction, the first low latency instruction taking at least two inputs;
   a data memory interface communicably coupled to the audio fabric block; and
   a first vector register file communicably coupled to the data memory interface, the vector register file including a first vector register storing the at least two inputs, wherein the execution unit includes a first vector execution unit communicably coupled to the first vector register file, wherein the first vector execution unit is configured to perform multiple operations on one of the at least two inputs in a single execution of the low latency instruction and store the results in a second vector register of the vector register file.

4. The multi-core audio processor of claim 2, wherein the single sample processing core further comprises a second vector execution unit, the second vector execution unit including a multiplication operation unit configured to multiply the third output by a combination of the first and second outputs of the first vector execution unit to generate a filter coefficient.

5. The multi-core audio processor of claim 1, wherein the single sample processing core further comprises an additional execution unit configured to generate a filtered sample based on input sampling rate coefficients applied to an input sample received from the audio fabric block and to store the filtered sample in a data buffer.

6. The multi-core audio processor of claim 5, wherein the additional execution unit is configured to apply output sampling rate coefficients to generate a set of scaled samples used to generate output samples at a different sampling rate than a sampling rate of the stream.

7. The multi-core audio processor of claim 1, wherein the single sample processing core further comprises:
a vector register file; and
a vector execution unit communicably coupled to the vector register file, the vector execution unit having a plurality of hard-wired routes coupling the vector register file to multiplication units of the vector execution unit.

8. The multi-core audio processor of claim 7, further comprising a set of state registers communicably coupled to the vector execution unit, the state registers storing a plurality of assignment vectors assigning vector locations in the vector register file to the multiplication units, the vector execution unit configurable to selectively retrieve an assignment vector from the set of state registers based on a field input.

9. A multi-core audio processor comprising:
a data protocol interface configured to receive a stream of audio data, the stream of audio data having a first sampling rate;
a plurality of data processing cores including a single sample processing core and a block data processing core;
an audio fabric block configured to route samples of the stream between the data protocol interface and the plurality of data processing cores;
wherein the single sample processing core comprises a first execution unit configured to execute a first instruction for computing multiple values used to filter a sample in a single instruction cycle, the first instruction comprising one or both of a complex exponential instruction and a sample rate conversion instruction.

10. The multi-core audio processor of claim 9, wherein the single sample processing core comprises:
a register file communicably coupled to the first execution unit, the register file configured to store an angle and a magnitude of a pole coefficient of a phasor filter, wherein the first instruction configures the first execution unit to compute a sine of the angle, a cosine of the angle, and an exponential function of the magnitude.

11. The multi-core audio processor of claim 10, wherein the register file is a vector register file storing the angle and the magnitude in a single vector register thereof.

12. The multi-core audio processor of claim 9, wherein the single sample processing core further comprises a second execution unit configured to execute a second instruction that computes a quotient based on an elapsed time in units of input samples and an output sample time increment.

13. The multi-core audio processor of claim 12, wherein the audio fabric block further includes an input sample counter communicably coupled to the single sample processing core, the input sample counter configured to count a number of samples of the physical stream received at the data protocol interface, wherein the single sample processing core is configured to compute the elapsed time based on the number of samples of the physical stream and a presentation time of the input sample.

14. The multi-core audio processor of claim 12, wherein the single sample processing core is configured to execute an output stage of a phasor filter a number of times that corresponds to the quotient.

15. The multi-core audio processor of claim 12, wherein the second execution unit executes a Sweeney, Robertson, and Tocher (SRT) division algorithm to generate a six bit quotient.

16. The multi-core audio processor of claim 9, wherein the single sample processing core further comprises a filter coefficient execution unit configured by an instruction to generate filter coefficients based on outputs received from the first execution unit.

17. A single sample audio processing core comprising:
an instruction memory interface communicably coupled to a memory;
a data memory interface configured to receive a sample of audio input data;
a vector register file communicably coupled to the data memory interface;
an execution unit communicably coupled to the vector register file, the execution unit including a plurality of operation units and hard-wired routes from inputs of the operation units to locations of the vector register file; and
a set of state registers communicably coupled to the execution unit, the set of state registers configured to store assignment vectors assigning locations of the vector register file to the inputs of the operation units, wherein the execution unit is configured to execute an instruction having two vector inputs and an immediate field, the immediate field identifying locations of the vector register file or one of the assignment vectors.

18. The single sample audio processing core of claim 17, wherein the execution unit includes a logic unit configured to enable at least one of the hard-wired routes based on a bit value of the immediate field.

19. The single sample audio processing core of claim 18, wherein the execution unit is configured to retrieve an assignment vector assigning locations of the vector register file to the inputs based on the bit value of the immediate field.

20. The single sample audio processing core of claim 17, wherein the plurality of operation units include multipliers configured to multiply values of the two input vectors identified via the immediate field.

* * * * *